United States Patent [19]
Sinden

[11] Patent Number: 6,044,174
[45] Date of Patent: Mar. 28, 2000

[54] METHOD AND APPARATUS FOR PARAMETRIC REPRESENTATION OF HANDWRITTEN SYMBOLS

[75] Inventor: Frank William Sinden, Princeton, N.J.

[73] Assignee: Lucent Technologies Inc., Murray Hill, N.J.

[21] Appl. No.: 08/729,463

[22] Filed: Oct. 11, 1996

[51] Int. Cl.[7] .................................................. G06K 9/00
[52] U.S. Cl. ......................... 382/187; 382/202; 382/197; 345/16; 178/18.01
[58] Field of Search ................................... 382/187, 186, 382/197, 202, 189, 315, 198, 241; 345/16, 17; 178/18, 19, 20

[56] References Cited

U.S. PATENT DOCUMENTS

| | | | |
|---|---|---|---|
| 4,550,438 | 10/1985 | Convis et al. ........................ | 178/18.01 |
| 5,454,046 | 9/1995 | Carman, II .............................. | 382/187 |
| 5,559,897 | 9/1996 | Brown et al. ........................... | 382/187 |
| 5,577,135 | 11/1996 | Grajski et al. ......................... | 382/187 |
| 5,596,656 | 1/1997 | Goldberg ................................ | 382/186 |
| 5,698,822 | 12/1997 | Haneda et al. .......................... | 178/18 |
| 5,740,273 | 4/1998 | Parthasarathy et al. ................ | 382/187 |
| 5,761,328 | 6/1998 | Solberg et al. ......................... | 382/198 |

*Primary Examiner*—Amelia Au
*Assistant Examiner*—Gilberto Frederick, II

[57] ABSTRACT

A method for encoding handwritten symbols operates upon penstroke data received from a device capable of sampling a stylus position at discrete intervals. Each handwritten symbol is segmented into an ordered sequence of discrete strokes. An arc length and initial and final tangent angles are evaluated for each of these strokes. Each stroke is encoded in the form of a parameter set comprising position coordinates of the initial and final endpoints of the stroke, the arc length, and the initial and final tangent angles. In specific embodiments of the invention, the segmentation is based, in part, on properties of the handwritten symbol when it is expressed as a curve $\phi(s)$, wherein s represents arc length and $\phi$ represents the net turning angle.

1 Claim, 3 Drawing Sheets

● STEP 2 POINTS
◆ MIDPOINTS

METHOD AND APPARATUS FOR PARAMETRIC REPRESENTATION OF HANDWRITTEN SYMBOLS

FIELD OF THE INVENTION

This invention relates to the processing of human handwriting for purposes of information storage, automatic character recognition, and the like. More particularly, this invention relates to the processing of spatiotemporally sampled symbols, including the representation of such symbols in parametric form.

ART BACKGROUND

The automatic analysis of human handwriting begins with sampling and digitization of the image or signal produced directly by human manipulation of a writing instrument, referred to herein, in a general sense, as a stylus. Purely graphical analysis can be performed on data sampled from a static image. However, for dynamic analysis, and more generally for analyzing data with reference to a temporal sequence, it is advantageous for the human subject to produce data by manipulating an instrumented stylus or tablet that permits spatiotemporal sampling.

One exemplary instrumented tablet is described in U.S. Pat. No. 5,463,388, issued on Oct. 31, 1995 to R. A. Boie et al. This tablet includes a rectangular array of capacitance-sensing electrodes. The position of a hand-held stylus is determined, e.g., from the centroid of the respective capacitance values, as calculated in a microcontroller.

Parametric methods have been used for a number of years in connection, for example, with automatic signature verification. According to these methods, the signature (or other handwritten symbol) is represented in an abstract parameter space. The parametric representation consists of a set of numerical values of functions that are evaluated on the sampled data, and that relate to some combination of graphical and dynamic properties of the sampled data. Generally, a parametric representation is a condensed representation, in the sense that it occupies fewer bits of data-storage capacity than do the raw, sampled data.

Parametric representations of signatures have been used with some success for signature verification. In signature verification, the parameters are evaluated on a newly entered signature (or group of signatures), and the results are compared with a stored set of reference values. Such a procedure does not require the reconstruction, from parameters, of either the reference signature or the newly entered signature. Therefore, there is no need to choose parameters that preserve enough graphical information to reconstruct these signatures. Instead, parameters for signature verification are selected on the basis, e.g., of a tradeoff between selectivity and computational efficiency.

SUMMARY OF THE INVENTION

I have invented a parametric representation of handwritten symbols that not only permits efficient data storage, but also permits the symbols to be reconstructed, with a high degree of legibility, from the stored parameters.

Thus, in one broad aspect, my invention involves a method for representing a handwritten symbol in parametric form. This method comprises obtaining a temporally sequenced record of data points. Each of these data points describes the x and y coordinates of a sampled point on the handwritten symbol, and also includes a pen-condition flag that describes whether the pen was in the pen-up or pen-down position when that data point was recorded. (Instrumented tablets are available that will indicate not only whether the pen was up, but also what the pen pressure was on the tablet. In cases when such a tablet is used, it will often be useful to apply a threshold to the pen-pressure data, and set the pen-condition flag to "pen up" whenever the pressure falls below the threshold.)

The method further comprises segmenting the handwritten symbol into elementary strokes. As will be seen below, this segmentation is typically achieved by identifying natural breakpoints between strokes. Breakpoints are identified by such criteria as abruptness of direction changes, as well as by pen lifts.

The method further comprises recording, for each stroke, a so-called standard parameter set that comprises the x and y coordinates of the stroke's endpoints, the arc length s of the stroke, the net turning angle $\phi$, and the relative initial tangent angle $\theta$. The net turning angle is defined with reference to the tangent to the stroke (treating the stroke as a geometrical curve). If the tangent is envisaged as a directed, rigid rod lying against the stroke, then $\phi$ is the net angle through which the rod rotates as the point of tangency moves along the curve from the initial to the final endpoint. The relative initial tangent angle $\theta$ is defined with reference to the endpoint vector; i.e., the vector from the initial to the final endpoint. More specifically, $\theta$ is the angle from the endpoint vector to the tangent at the initial endpoint.

DETAILED DESCRIPTION

Figure 1:
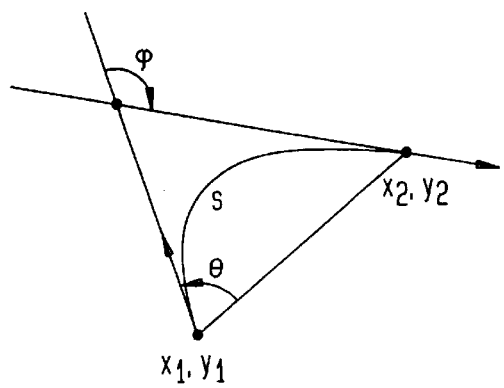
FIG. 1 illustrates the standard parameter set for stroke representations, according to the invention in one embodiment.

The standard parameter set for an exemplary curve is illustrated in FIG. 1. As noted above, the parameters include the Cartesian coordinates $x_1,y_1$ and $x_2,y_2$ of the endpoints, the angle $\theta$ of the initial tangent measured from the endpoint vector, the angle $\phi$ through which the tangent turns as the point of tangency traverses the curve, and the curve's arc length s.

Figure 2A:
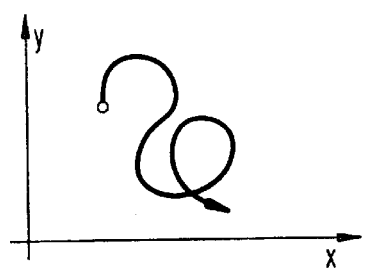
FIG. 2A is a representation of an illustrative curve in the Cartesian plane.
Figure 2B:
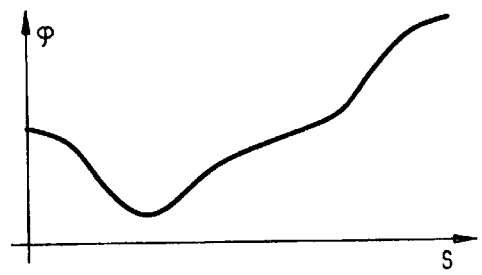
FIG. 2B is a representation of the curve of FIG. 2A in the s,$\phi$ plane.

As illustrated in FIGS. 2A and 2B, any continuous curve in the Cartesian plane (FIG. 2A) is readily represented by a single-valued function $\phi(s)$ (FIG. 2B), where $\phi(s)$ is the tangent angle at distance s from the starting point as measured along the curve. Because φ(s) is derived incrementally from the Cartesian curve by taking the polar coordinates Δs,φ(s) of each Cartesian increment Δx, Δy, I will call φ(s) the "polar curve" associated with the given Cartesian curve.

The polar curve has certain properties that make is convenient for analyzing handwritten symbols. As noted, φ(s) is a single-valued function. Moreover, φ(s) is invariant to a translation of the Cartesian curve. A rotation of the Cartesian figure shifts φ(s) up or down without changing its shape. A magnification of the Cartesian figure stretches φ(s) in the s-direction. Any straight line segment in the Cartesian plane maps into a horizontal line segment in the polar plane. Any circular arc in the Cartesian plane maps into a diagonal line segment in the polar plane. (The slope of the line segment is proportional to the curvature of the arc.) An inflection point in the Cartesian plane (i.e., a point where the curvature changes sign) maps into a maximum or minimum of the corresponding polar curve.

Curves produced by human handwriting are often interrupted by pen lifts. The sampling process can generally provide the coordinates of the point where the pen left the tablet, and the coordinates of the point where the pen returned to the tablet. However, the actual trajectory of the pen between these points is not available, in general. Therefore, in general, there is no way to attribute values of the arc-length variable s to this trajectory. Because of this, the polar curve φ(s) loses track of the relative locations of the respective curve segments before the pen lift and after the return of the pen to the tablet.

Figure 3A:
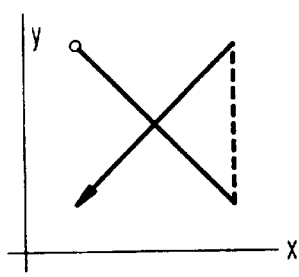
FIG. 3A is a representation, in the Cartesian plane, of a pair of pen strokes having an intervening pen-lift segment.
Figure 3B:
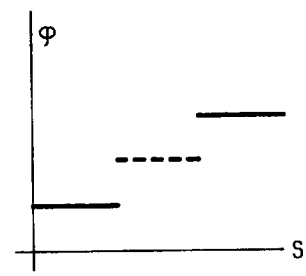
FIG. 3B is a representation, in the s,$\phi$ plane, of the pen strokes of FIG. 3A. A dotted line appearing in the figure is an artificial representation of the pen-lift segment.

A convenient artifice is advantageously used to fill in this missing information. As illustrated in FIGS. 3A and 3B, a straight line segment is added to the Cartesian plane, connecting the pen-up and pen-down points. As explained above, this line segment maps into a horizontal line segment in the polar plane.

When this artifice is included, the polar curve contains enough information to permit reconstruction of the Cartesian curve according to the formulas:

$$x(s) = \int_0^s \cos(\phi(s'))ds'$$

$$y(s) = \int_0^s \sin(\phi(s'))ds'.$$

As will be seen below, the standard parameter set (which contains far less data than the complete polar representation of a stroke) will alone generally provide sufficient information for a highly legible reconstruction of the stroke.

Thus, the practice of the invention will typically include representing a handwritten symbol as a polar curve, segmenting the polar curve into strokes, and evaluating the standard parameter set as a condensed record of each stroke.

Figure 4:
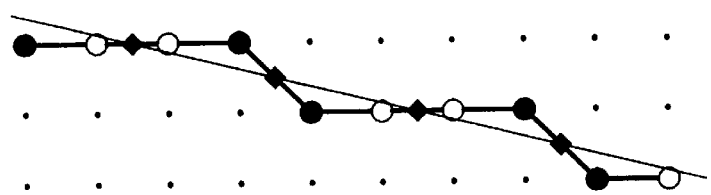
FIG. 4 illustrates a smoothing procedure useful for the practice of the invention in some embodiments.

Smoothing. Before segmentation per se is undertaken, it is desirable to smooth the polar curve to remove, inter alia, quantization noise that comes from forcing the sampled data points to occupy points on a finite rectangular grid. According to a currently preferred smoothing algorithm, multiple points are collapsed; that is, any grid point sampled more than once is recorded as a single point, but the associated redundancy is also recorded as a weight in the statistical sense. Then, straight lines are collapsed; that is, any straight run of collinear points has only its first and last points recorded. The weights of the deleted points are reallocated to the first and last points in such a way as to leave the centroid of the weights unchanged. Then, midpoints are assigned; that is, each adjacent pair of points is replaced by a weighted midpoint at the centroid of the corresponding weights. This procedure is illustrated in FIG. 4.

One exception is made to this procedure in order to prevent the corner at the meeting of two long intervals from being bypassed by a diagonal. Given two such long intervals, the midpoint of the first interval is assigned to the corner joint. The length of an interval to be treated in this manner, and the sharpness that defines a corner, are determined by appropriate threshold tests.

Figure 5A:
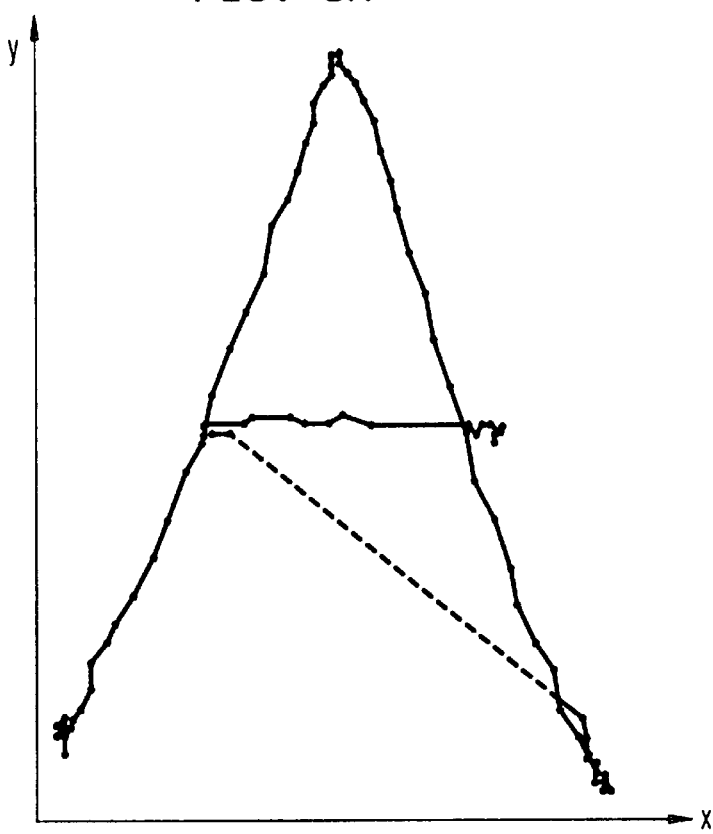
FIG. 5A is a representation, in the Cartesian plane, of a handwritten letter "A."
Figure 5B:
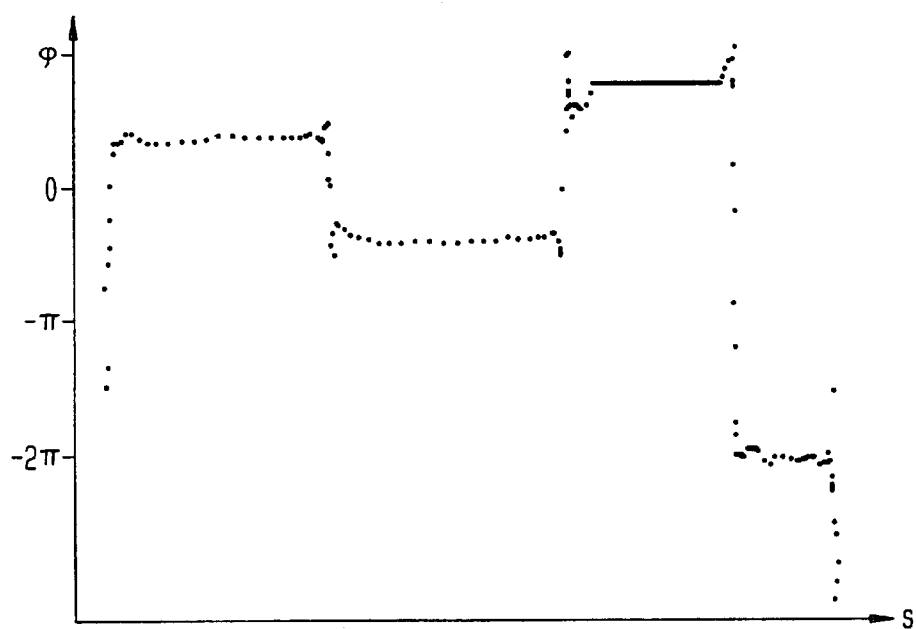
FIG. 5B is a representation, in the s,$\phi$ plane, of the handwritten letter "A" of FIG. 5A.

Segmentation. Our preferred segmentation procedure inserts breakpoints at corners and cusps, where direction changes abruptly. These features appear as discontinuities in the polar curve. For example, FIGS. 5A and 5B show data from a handwritten Roman letter A. The polar curve of FIG. 5B shows each of the natural strokes of the letter as a horizontal line segment set off by discontinuities. It is also significant, as will become apparent below, that the stylus moves more slowly near the discontinuities than it does elsewhere, as evidenced by the fact that the s coordinates of the sampled points lie closer together near the discontinuities.

A filter function is readily defined that assumes relatively high values at discontinuities and pen slowdowns, and still higher values when both of these features occur together. An adjustable threshold is readily applied to the output of this function for discriminating actual corners and cusps from background noise. The threshold level should be chosen carefully. If it is too low, natural strokes will be subdivided into an excessive number of smaller strokes. If it is too high, a pair of strokes separated by, e.g., a slightly rounded corner will be interpreted as a single stroke. In some cases, it may be advantageous to discriminate through the use of multiple threshold levels.

The thresholded filter partitions the list of data points into a sequence of alternating subsets referred to herein, respectively, as strokes and transitions. If the filter output is below threshold at a given point, that point lies in a stroke. Otherwise, the point lies in a transition. A separate thresholding operation eliminates apparent strokes that are shorter than a preset lower bound and lie within transitions.

Points that belong to transitions are discarded; points that belong to strokes are retained.

It should be noted that the results of the thresholded filter function are dependent upon curvature and pen speed. Therefore, these results will vary with changes in the temporal and spatial scales, unless an appropriate normalization procedure is used. For applications to discrete symbol recognizers, the natural unit for normalization is the complete symbol. Therefore, we currently prefer to normalize by scaling each symbol to a standard height, and then scaling time such that the maximum pen speed is defined as having a standard value such as unit value.

In addition to finding cusps and corners, it is advantageous to search for significant pen lifts and pen landings that might have failed to generate an above-threshold response from the filter function, and to place breakpoints at such locations. However, this task is complicated by the tendency of some writers to execute abrupt direction changes by lifting the pen too late, or landing the pen too soon, relative to a reorientation of the pen that was meant to take place entirely in the pen-up state. I refer to the graphical results of these direction changes as hooks. Hooks can be recognized as short, straight pendown strokes that are roughly aligned with adjacent (artificial) pen-up strokes.

Furthermore, it is advantageous to place breakpoints at major inflection points and at certain closely spaced pairs of inflection points. As noted above, an inflection point is represented as a maximum or minimum of the polar curve.

According to our current procedure, we seek the overall maximum and minimum of the locally smoothed curve $\phi(s)$ within each individual segment (as defined by the steps described thus far). The maximum point $s_M$ and the minimum point $s_m$ are collectively referred to as extremal points. We count an extremal point as an inflection point if it is sufficiently separated from both endpoints of the segment (in the polar plane) and from the other extremal point.

That is, a threshold $\Sigma$ and a threshold $\Phi$ are preset. Then an extremal point $(s_e, \phi_e)$ is counted if: (i) $s_e$ differs by at least $\Sigma$ from the s-coordinates of both endpoints and the other extremal point, and (ii) $\phi_e$ differs by at least $\Phi$ from the corresponding $\phi$-coordinates.

This procedure finds only major inflection points, and is insensitive to those produced by minor waviness of the pen stroke. Consequently, the procedure as thus far described may overlook significant features such as the cusp of a numeral 3 or of a Roman letter B that has been perfunctorily formed as a rounded dent. To mitigate this problem, we have included a special procedure for seeking closely spaced pairs of inflection points. This additional procedure seeks pairs consisting of a local maximum and a local minimum of the polar curve that: (i) are sufficiently close together in the s dimension (as determined by a further threshold test); and (ii) are sufficiently separated in both the s and $\phi$ dimensions from the endpoints of the stroke.

If a given pair of extrema satisfies these three conditions, a break is inserted at the midpoint between the extrema (in the s dimension), and the endpoint tangent angles are assigned the respective values of $\phi$ at the two inflection points. This has the effect of substituting a sharp corner for the perfunctory dent.

Calculation of Stroke Parameters. The output of the segmentation procedure is a list of point coordinates for each stroke. Each list is reduced to the standard parameters for the corresponding stroke as explained below.

The Cartesian endpoints are set equal, respectively, to the first coordinate pair and the last coordinate pair on the list. The arc length s is obtained by summing the lengths of the interpoint increments (i.e., by evaluating a discretized approximation to the path-length integral).

Further smoothing is desirable for obtaining the angles $\theta$ and $\phi$. The angle $\theta$ is obtained by taking a linear regression over the angles of the first several increments, and then evaluating the linear regression function at the initial endpoint. At the final endpoint, a similar regression yields the angle $\theta+\phi$.

Figure 6:
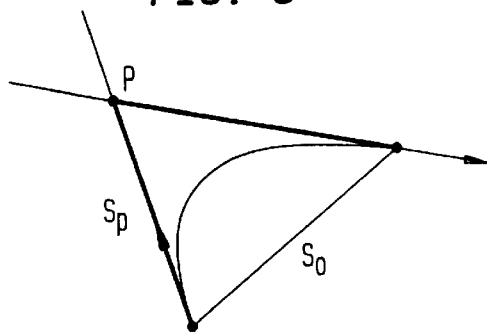
FIG. 6 illustrates certain auxiliary parameters useful for stroke representations, according to the invention in some embodiments.

For some applications, certain auxiliary parameters may be a useful supplement to the set of standard parameters. Exemplary such auxiliary parameters, illustrated in FIG. 6, are: the length $s_0$ of the endpoint vector, which extends from the initial to the final endpoint of the stroke; the Cartesian coordinates of the point P where the initial and final tangents intersect; and the path length $s_P$ from the initial to the final endpoint via P (i.e., along two legs of the triangle having a vertex at P and having the endpoint vector as a base). In addition, it will be useful in at least some cases to record a binary indicator f which assumes one binary value when the pen is up, and the other binary value when the pen is down. Such a binary pen-up indicator is useful for distinguishing artificial strokes (representing pen-up displacements of the stylus) from strokes that were actually drawn.

Alternative Format of Stroke-Parameter Data. It will be recalled that the angle $\theta$ is the angle of the initial tangent, relative to the endpoint vector, and that the angle $\phi$ is the net turning angle of the tangent as the point of tangency traverses the stroke. It will be appreciated that this is not a unique way to represent the tangency directions of the stroke. For example, let the tangent of angle $\rho$ be the slope of the endpoint vector; i.e., let $\rho$ be defined by $$\rho = \arctan\frac{(y_2 - y_1)}{(x_2 - x_1)}.$$

Then the initial and final tangent angles, relative to the x-axis, are given by $\psi_1=\rho+\theta, \psi_2=\rho+\theta+\phi$.

For at least some applications, we have found it convenient to use the rash, following format for recording stroke-parameter data for $$\frac{m}{2}$$

strokes:

| $s_1$ | $\psi_1$ | $x_1$ | $y_1$ |
| $s_2$ | $\psi_2$ | $x_2$ | $y_2$ |
| $s_3$ | $\psi_3$ | $x_3$ | $y_3$ |
| $s_4$ | $\psi_4$ | $x_4$ | $y_4$ |
| ... | ... | ... | ... |
| $s_m$ | $\psi_m$ | $x_m$ | $y_m$ |

Here, each line corresponds to an endpoint; thus, each pair of sequential lines corresponds to a stroke if the first line of the pair is odd-numbered, and each pair corresponds to a joint between strokes if the first line is even-numbered. Each of the angles $\psi_i$ is a tangent angle, relative to the x-axis. The arc length s and the pen-up indicator f each only need to be recorded once per stroke (i.e., once per pair of lines). Therefore, we represent s and f alternately in the column denoted $s_i$. That is, $s_i$ is the arc length if i is odd, and is the pen-up indicator if i is even.

Utilization of Stroke-Parameter Data. The standard parameters can be readily used as input for machine recognition of symbols. In such cases, it is unnecessary to reconstruct legible graphical symbols from these abstract data if, e.g., a machine-recognition system is provided that classifies input patterns by comparing stroke parameters directly with the stroke parameters of stored library symbols.

On the other hand, appropriate reconstruction is needed if the original writing is to be reconstructed for ordinary reading by a human user. In such cases, a curve must be provided for representing each stroke. Each of these curves must satisfy the endpoint conditions of the stroke. These conditions are satisfied, by definition, if: (i) the initial and final endpoints of the provided curve coincide with the initial and final stroke endpoints $(x_1,y_1)$ and $(x_2,y_2)$, respectively; (ii) the arc length of the provided curve is equal to s; and (iii) the angles of the initial and final tangents of the provided curve are those angles specified by $\theta$ and $\phi$.

In general, there are infinitely many curves that will satisfy a given set of endpoint conditions. One exemplary approach to selecting a unique curve that satisfies these conditions is based on the spring wire model. A piece of spring wire constrained to satisfy conditions (i), (ii), (iii) above will assume the unique shape that minimizes stored elastic energy. Mathematically, stored elastic energy is proportional to the integral, over s, of the squared curvature. Minimizing this integral, then, subject to conditions (i), (ii), (iii) yields a unique reconstruction curve.

According to another exemplary approach, each reconstructed curve is composed of smoothly joined straight lines and circular arcs. If the arcs are constrained to have equal radii and the number of segments (lines and arcs) is minimized, then for a given set of stroke parameter values the curve is unique. Moreover, the number of segments in this unique curve is always less than or equal to three. A simple algorithm finds the segments. This approach is described in detail in my co-pending U.S. patent application Ser. No. 08/729,466, "Method And Apparatus For Reconstructing Handwritten Symbols From Parametric Representations Thereof," assigned to the assignee hereof, which is hereby incorporated by reference.

Figure 7:
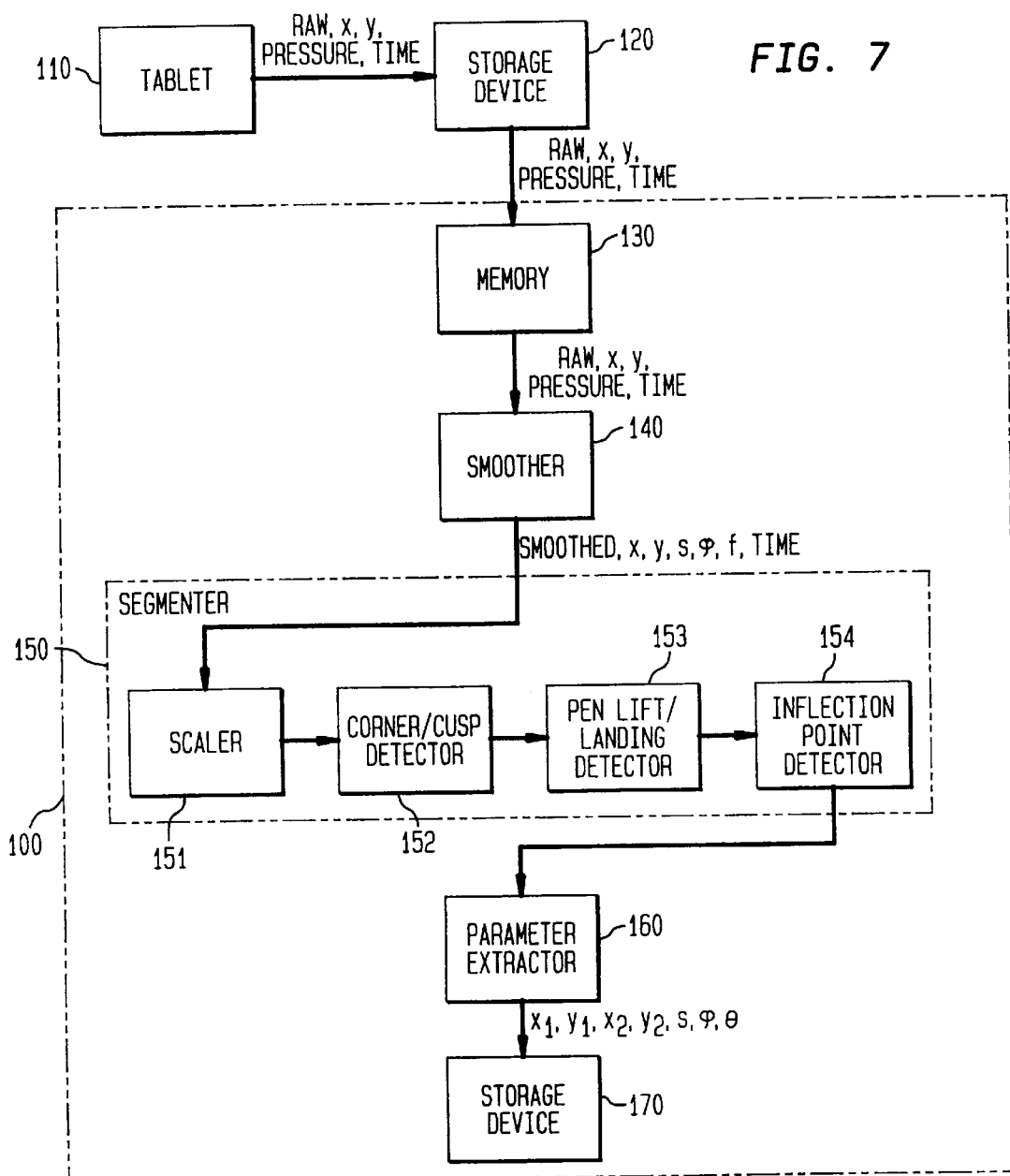
FIG. 7 illustrates a machine for producing stroke-parameter data.

A Machine for Producing Stroke-Parameter Data. The illustrative machine 100 schematically depicted in FIG. 7 receives raw data from an input device such as tablet 110. Optionally, the raw data are first stored in a storage device 120 such as a magnetic disk or computer memory, and later read into a memory 130 of machine 100. The various operations performed in machine 100, after fetching the raw data from memory 130, may readily be carried out by special-purpose circuits designed to carry out such operations. However, in many cases it will be most convenient to carry out these operations in a digital signal processor or general-purpose digital computer under the control of the respective portions of an appropriate computer program. In either case, the operative entity for carrying out each of the respective operations is discussed individually in the following discussion, and referred to a respective block of the accompanying FIG. 7.

Smoother 140 processes the raw data from memory 130, thereby to produce a reduced set of smoothed data points. Typically, the output of the smoother will include polar as well as Cartesian coordinates, and will include a binarized pen-up indicator. Although pen pressure data may be useful in at least some smoothing procedures, these data will not typically be included, explicitly, in the output of the smoother. As noted above, the time coordinate will typically be useful for segmentation.

Segmenter 150 assigns sets of contiguous data points to discrete segments, according, e.g., to the segmentation procedure described above. In accordance with that procedure, segmenter 150 includes scaler 151 for normalizing height and time in order to make the segmentation procedure invariant to changes in spatiotemporal scale. The segmenter further includes detector 152 for corners and cusps, detector 153 for pen lifts and pen landings, and detector 154 for inflection points. The utilization of the resulting output data in the exemplary segmentation procedure is described above.

The stroke-by-stroke output of segmenter 150 is processed by parameter extractor 160 to produce, e.g., the standard parameter set and whatever auxiliary parameters are desired.

The output parameter data are then stored in a suitable medium 170, such as a computer memory or other data-storage device.

The invention claimed is:

1. A method for encoding handwritten symbols, comprising the steps of:

a) reading, from a memory device, at least one handwritten symbol in the form of data derived, at least in part, by sampling a stylus position at discrete intervals during formation of said at least one symbol:

b) segmenting each symbol read from the memory device into an ordered sequence of discrete strokes, each said stroke having an initial and a final endpoint, an arc length s between said endpoints, initial and final tangent angles at the initial and final endpoints, respectively, and a difference angle $\Phi$ between the initial and final tangent angles, wherein the tangent angles of the endpoints are defined relative to a directed tangent associated with each of the endpoints;

c) evaluating, for each said stroke, the arc length thereof and the initial and final tangent angles at the initial and final endpoints, respectively, to create for each said stroke a set of standard parameters which, when evaluated, will produce a condensed record of each said stroke;

d) in a memory device, storing for each said stroke the standard parameter set;

e) smoothing, before the segmenting step, the handwritten symbol data; and;

f) representing the handwritten symbol data in a plane having as coordinates the arc length s, and the difference angle $\phi$ between the initial and final tangent angles, such that the handwritten symbol data define a curve $\phi(s)$ in said s-$\phi$ plane, wherein the segmenting step comprises detecting major inflection points and assigning breakpoints where such inflection points are detected, and wherein the steps of detecting inflection points and assigning breakpoints at inflection points comprise searching for maxima and minima over segments resulting from a partial segmentation of the curve $\phi(s)$, and assigning a breakpoint to each maximum and minimum that is separated from any endpoint of said segment, and also separated from the other maximum or minimum over said segment, by more than a threshold value, and wherein the steps of detecting inflection points and assigning breakpoints further comprise searching for pairs that consist of a local maximum and a local minimum over each segment resulting from a partial segmentation of the curve $\phi(s)$, and assigning a breakpoint to each said pair that is more closely spaced in the s-dimension that a second threshold, and more distant from any segment than a third threshold.

* * * * *